(12) United States Patent
Dill et al.

(10) Patent No.: US 7,497,519 B2
(45) Date of Patent: Mar. 3, 2009

(54) GEARED FITTING FOR A VEHICLE SEAT

(75) Inventors: Thomas Dill, Heiligenmoschel (DE); Ulf Schäffling, Gaugrehweiler (DE); Viktor Enns, Kaiserslautern (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 466 days.

(21) Appl. No.: 11/249,800

(22) Filed: Oct. 13, 2005

(65) Prior Publication Data
US 2006/0084547 A1 Apr. 20, 2006

(30) Foreign Application Priority Data
Oct. 15, 2004 (DE) .................. 10 2004 050 152

(51) Int. Cl.
*B60N 2/48* (2006.01)
(52) U.S. Cl. ................... 297/362; 475/162; 475/175
(58) Field of Classification Search ............. 297/362; 475/162–165, 175, 177
See application file for complete search history.

(56) References Cited

U.S. PATENT DOCUMENTS

| | | | |
|---|---|---|---|
| 5,277,672 A | 1/1994 | Droulon et al. | |
| 5,536,217 A | 7/1996 | Droulon et al. | |
| 5,611,747 A * | 3/1997 | Bauer et al. ............... | 475/162 |
| 5,871,414 A * | 2/1999 | Voss et al. ............... | 475/175 |
| 6,533,356 B2 | 3/2003 | Teufel | |
| 6,619,743 B1 * | 9/2003 | Scholz et al. .............. | 297/362 |
| 6,692,397 B2 * | 2/2004 | Wang et al. ............... | 475/162 |
| 6,715,832 B2 | 4/2004 | Dill | |
| 6,918,635 B2 | 7/2005 | Finner et al. | |
| 2005/0176553 A1 | 8/2005 | Boltze | |
| 2005/0179297 A1 * | 8/2005 | Finner et al. .............. | 297/362 |
| 2006/0025270 A1 * | 2/2006 | van de Geer et al. ........ | 475/162 |

FOREIGN PATENT DOCUMENTS

| | | |
|---|---|---|
| DE | 100 18 108 A1 | 10/2001 |
| DE | 103 05 407 A1 | 8/2004 |
| DE | 10 2004 005 980 | 6/2005 |
| DE | 101 20 854 | 8/2005 |
| EP | 1 145 897 A2 | 10/2001 |
| WO | WO 03/024740 A1 | 3/2003 |

OTHER PUBLICATIONS

U.S. Appl. No. 11/136,248, filed May 24, 2005; In re: Thomas Dill, entitled *Geared Fitting for a Vehicle Seat*.

* cited by examiner

*Primary Examiner*—Laurie K Cranmer
(74) *Attorney, Agent, or Firm*—Womble Carlyle Sandridge & Rice, PLLC

(57) ABSTRACT

In a geared fitting (11) for a vehicle seat, in particular for an automotive seat, having a first internal geared wheel (13), an eccentric (21) rotatable about an axis of rotation (A), a pinion (22) driven by the eccentric (21) and meshing with the first internal geared wheel (13), and a second internal geared wheel (31) in which the pinion (22) meshes and which is mounted on the first internal geared wheel (13), at least one wedge system (27) is provided axially offset from the eccentric (21), with respect to the axis of rotation (A), the wedge system (27) acting to compensate for the play between one of the internal geared wheels (13, 31) and the other internal geared wheel (13, 31) and/or the pinion (22).

14 Claims, 2 Drawing Sheets

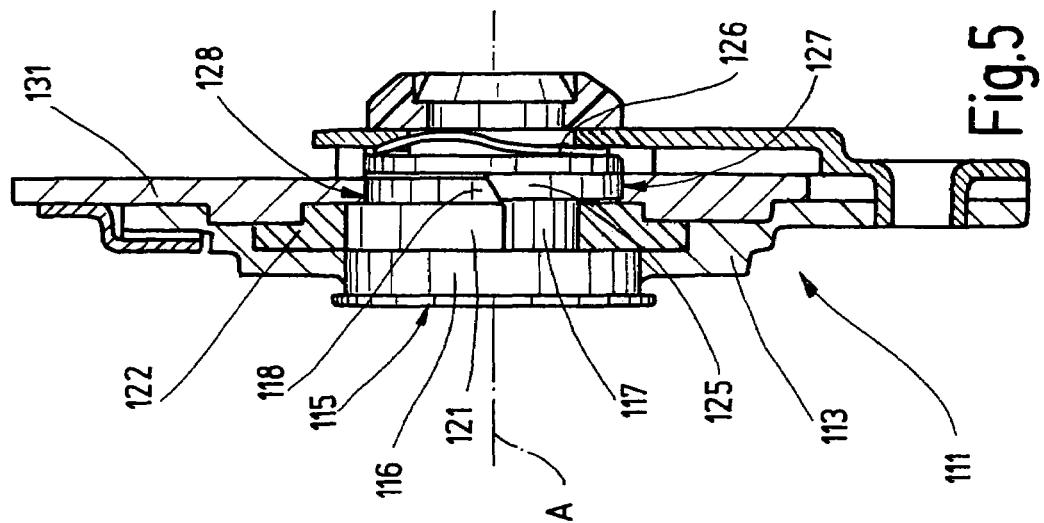
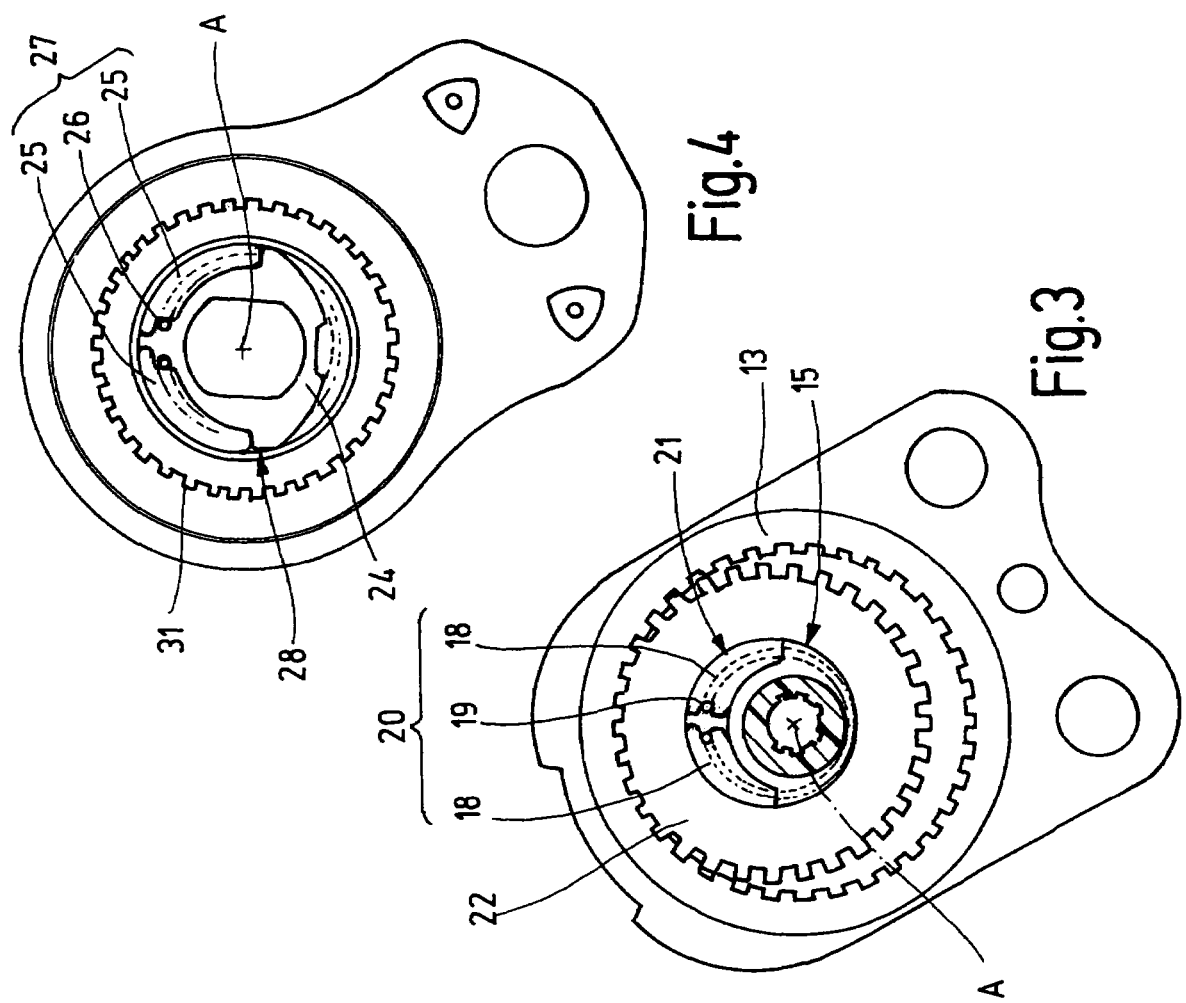

GEARED FITTING FOR A VEHICLE SEAT

BACKGROUND OF THE INVENTION

The present invention relates to a geared fitting for a vehicle seat, in particular for an automotive seat, with the fitting having a first internal geared wheel, an eccentric rotatable about an axis of rotation, a pinion driven by the eccentric and meshing with the first internal geared wheel, and a second internal geared wheel in which the pinion meshes, with the second internal geared wheel being mounted on the first internal geared wheel.

A geared fitting of the type described in the immediately preceding paragraph is known from U.S. Pat. No. 5,536,217. In U.S. Pat. No. 5,536,217, the pinion is driven by a multipart eccentric which consists of two discs arranged axially offset from each other with respect to the axis of rotation and mounted eccentrically on a driver, and also pretensioned against each other by means of a spring. In the axial direction, the two discs are completely arranged inside the pinion. Due to tolerances, a certain amount of play can occur between the internal geared wheels, which support each other, between the pinion and the first internal geared wheel supporting the driver, and between the pinion and the second internal geared wheel. Altogether, there exists three possibilities by which play may be created. The play between the first internal geared wheel and the pinion can be compensated for by means of the multipart eccentric.

BRIEF SUMMARY OF SOME ASPECTS OF THE INVENTION

In accordance with one example, an aspect of the present invention is the provision of improvements to a geared fitting, especially with regard to compensating for play.

In accordance with one example, a geared fitting for a vehicle seat, in particular for an automotive seat, includes a first internal geared wheel; an eccentric mounted for being rotated about an axis of rotation; a pinion mounted for being driven by the eccentric and meshing with the first internal geared wheel; a second internal geared wheel in which the pinion meshes, wherein the second internal geared wheel is mounted to the first internal geared wheel for there being relative movement between the first and second internal geared wheels in response to the eccentric being rotated about the axis of rotation; and at least one wedge system mounted axially offset from the eccentric with respect to the axis of rotation, wherein the wedge system is operative for compensating for play. The play can be (a) between one of the internal geared wheels and the other of the internal geared wheels and/or (b) between one of the internal geared wheels and the pinion.

Because at least one wedge system, acting between one of the internal geared wheels and the other internal geared wheel and/or the pinion, is provided axially offset from the eccentric with respect to the axis of rotation, there is an alternative means available to compensate for the play, preferably by causing relative radial displacements. For this purpose, preferably the second internal geared wheel is slidingly mounted on a disc that is defined at least partially by the wedge system and that is arranged substantially in alignment with the axis of rotation (centrically), any deviations being due to play. To compensate for the play, the wedge system then acts between the second internal geared wheel and the first internal geared wheel and/or the pinion. In case of one sole action direction, the smaller of the two amounts of play is compensated for and the larger amount of play is reduced to the same extent. The compensation of the play greatly reduces the generation of noise, for example a clicking sound when getting into the vehicle seat.

The wedge system can be designed in such a way that it works in opposite directions, thereby affecting the eccentric, i.e. it is effective in two planes and, via the eccentric, compensates for the play between the first internal geared wheel and the pinion. Also, a further wedge system (i.e. altogether two wedge systems) may be provided. The further wedge system at least partially defines the eccentric and acts to compensate for the play between the first internal geared wheel and the pinion. In both cases, two amounts of play are compensated for and the third amount of play is at least reduced. This differentiates the wedge system provided according to the invention from those wedge systems which are used, for example, in simply constructed wobble gears or in planetary gear trains in which the internal geared wheels do not support each other and where, due to other components and/or another type of mounting, other circumstances exist, in particular where there is less opportunity for play to occur. In preferred embodiments, each wedge system provided has two quarter-circular to semi-circular wedge segments arranged substantially in one plane (i.e. at most just a little axially offset from each other compared with their axial thickness) as well as a spring in pressure contact with at least one of the wedge segments.

The eccentric is driven preferably by a driver that is mounted by means of a first bearing section in the first internal geared wheel and that, when rotated around the axis of rotation, takes the eccentric with it, for example by means of a positive fit. For example, a second bearing section of the driver can at least partially define the eccentric, and/or a third bearing section of the driver can at least partially define the disc, whereby positive driving action occurs. The force compensating for the play then flows, on the one hand, from the driver via the wedge system to the pinion, then on to the internal geared wheel on the frame side and back to the driver and, on the other hand, from the driver via the wedge system to the second internal geared wheel and then on to the pinion or to the first internal geared wheel and back to the driver.

In a preferred embodiment, in combination with the wedge segments, a segment of a bearing section of the driver or a driver ring mounted on the bearing section, can on the one hand engage between the narrow sides of the wedge segments, and on the other hand can support the wedge segments on their curved inner surface, while the spring reaches between the mutually facing, broad ends of the wedge segments. The curved outer surface of the wedge segments is then in sliding contact with the pinion or the second internal geared wheel. In the solution having two wedge systems, these are arranged preferably on radially opposite sides and axially offset from each other with respect to the axis of rotation.

In a solution having a wedge system acting in two planes, the wedge segments are arranged preferably slightly offset in the axial direction of the axis of rotation; on the wedge segments' mutually facing end faces they have wedge surfaces in contact with each other. These wedge surfaces run at an angle to the axis of rotation, with the angle being outside the self-locking range. The contact force of a sole spring acting axially on one of the wedge segments, either directly or indirectly via a pressure element, is then converted by means of the sloping wedge surfaces into a radial motion of, or the radial exertion of force by, the wedge segments.

The geared fitting according to the invention can be used, for example, as an inclination adjuster of a seat cushion of a vehicle seat, where it defines a pivoting movement together with a simple joint. However, it is also conceivable to use the geared fitting according to the invention for other adjustments, for example of the backrest, in which case two geared fittings are then driven via a common transmission rod. The fitting may also be used to provide an additional pivoting axis in a folding backrest.

Other aspects and advantages of the present invention will become apparent from the following.

BRIEF DESCRIPTION OF THE DRAWINGS

In the following, the invention is described in greater detail on the basis of two exemplary embodiments shown in the drawings, in which:

FIG. 3 is a partial view of the first exemplary embodiment in the plane of the eccentric, FIG. 4 is a partial view of the first exemplary embodiment in the plane of the disc, and FIG. 5 is a cross section through the second exemplary embodiment.

DETAILED DESCRIPTION OF EMBODIMENTS

Figures 1, 2:
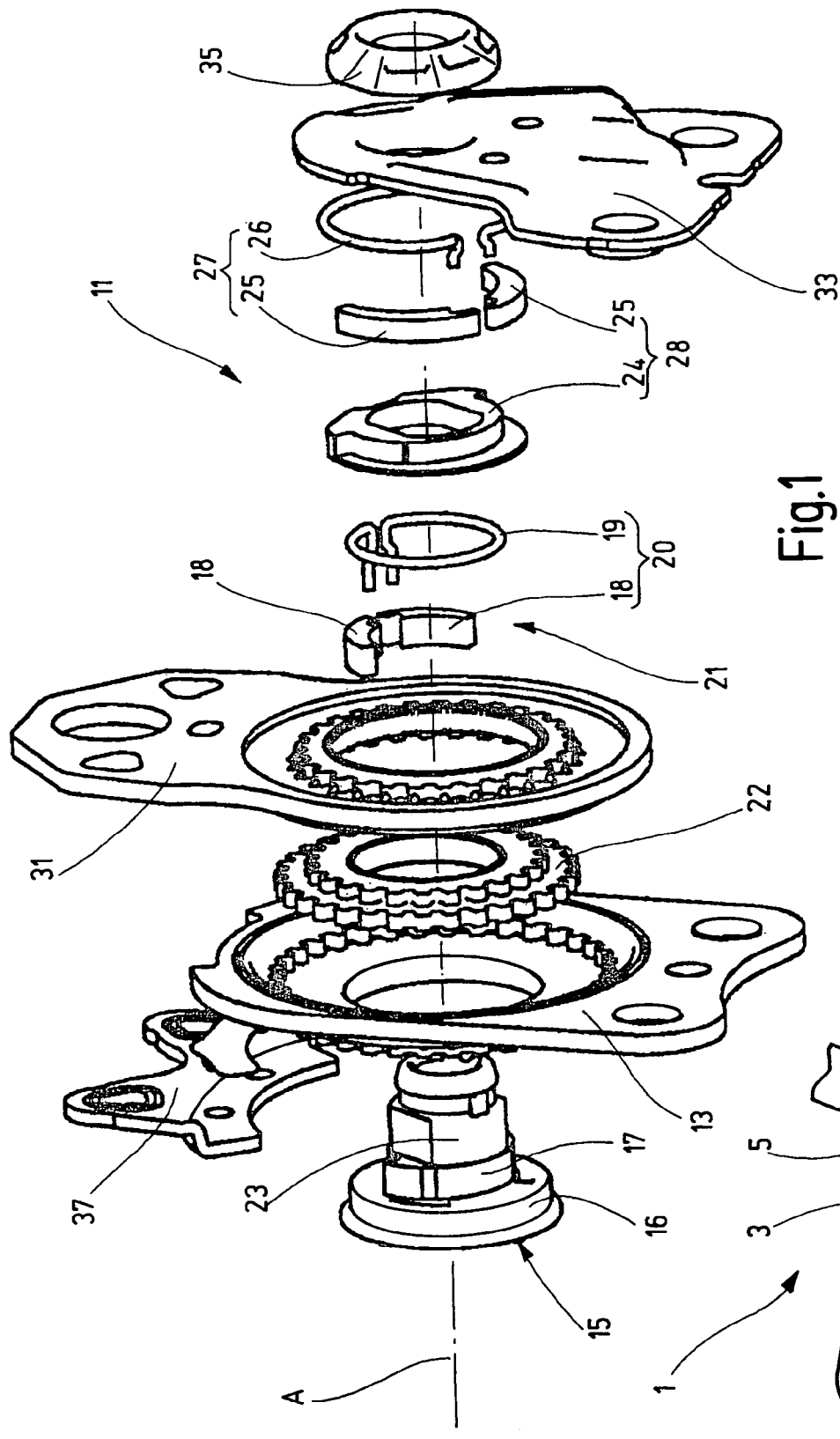
FIG. 1 is an exploded view of the first exemplary embodiment.
FIG. 2 is a partially cross-sectional, diagrammatic partial view of a vehicle seat.

On a vehicle seat 1, the seat cushion 3, which is attached on a seat shell, can be adjusted in its inclination relative to the seat frame 5. For this purpose, a crosspiece, which is designed as a tube and forms the front part of the seat frame 5, is coupled pivotably to the front ends of the two side parts of the seat frame 5. More specifically, on one side of the vehicle seat 1 (in the present case on the tunnel side (e.g., the side of the seat adjacent the tunnel or hump through which the drive shaft from the engine passes to the rear wheels in a rear-wheel drive automobile)), the crosspiece is attached to the front end of one of the two side parts of the seat frame 5 by means of a simple joint, in the region of which a compensation spring is also arranged. Also more specifically, and on the other side of the vehicle seat 1 (in the present case on the sill side (e.g., the side of the seat adjacent the respective door of the automobile)), the crosspiece is attached to the front end of the other of the two side parts of the seat frame 5 by means of a geared fitting 11. The pivoting movement of the crosspiece changes the height of the front edge of the seat cushion 3 and thus the inclination of the seat cushion 3.

Unless a deviating description is given below, the installation of the geared fitting 11 and the principle of its construction correspond to the descriptions contained in DE 103 05 407 A1 and U.S. patent application Ser. No. 11,136,248. The disclosure of each of DE 103 05 407 A1 and U.S. patent application Ser. No. 11,136,248 is incorporated herein by reference, in its entirety.

In a first exemplary embodiment, the geared fitting 11 includes a first internal geared wheel 13, and the first internal geared wheel 13 is on the frame side of the fitting 11 (e.g., that side of the geared fitting 11 that is for being attached to the seat frame 5 in accordance with the first exemplary embodiment). A driver 15 made of plastic is rotatably mounted by means of a first bearing section 16 in a central opening in the internal geared wheel 13 on the frame side of the fitting 11. The axis of rotation A of the driver 15 defines the cylindrical coordinate system used below. A flange which bears against the outside of the internal geared wheel 13 on the frame side of the fitting 11 is formed adjacent the first bearing section 16.

In the axial direction, at the end of the first bearing section 16 facing away from the flange, a second bearing section 17 adjoins the first bearing section 16 of the one-piece driver 15. The second bearing section 17 is formed, on the one hand, as a driver segment engaging with play between the narrow ends of two arcuate first wedge segments 18. On the other hand, the second bearing section 17 is supporting the first wedge segments 18 on their curved inner surfaces. The mutually facing broad ends of the first wedge segments 18 have recesses formed by projecting sections of material, and each of these recesses is in receipt of a respective axially bent end finger of a first annular spring 19 that forces the first wedge segments 18 apart from one another in the circumferential direction. The two first wedge segments 18 and the first annular spring 19 define a first wedge system 20.

In addition, the second bearing section 17 and the two first wedge segments 18, all three of which are arranged in one plane, together define an eccentric 21, i.e. the center point of this eccentric 21 being circumscribed by a circular line, is radially offset relative to the axis of rotation A. The longest part of the first annular spring 19 is arranged in a plane parallel to and axially offset from the eccentric 21. A pinion 22, which acts as a planetary gear in the geared fitting 11, is slidingly mounted on this eccentric 21, i.e. on the curved outer surfaces of the first wedge segments 18.

The pinion 22, by means of a first external toothing, meshes in an internal toothing of the internal geared wheel 13 on the frame side. The internal toothing of the internal geared wheel 13 is in a recessed space defined by the internal geared wheel 13. In a comparison between the first external toothing of the pinion 22 and the internal toothing of the internal geared wheel 13, the number of teeth differs by at least one. The external diameter of the pinion 22 (i.e. the tip diameter of its first external toothing) is smaller by at least one tooth height than the internal diameter of the internal geared wheel 13 (i.e. the root diameter of internal toothing of the internal geared wheel 13).

The second bearing section 17 of the driver 15 is adjoined in the axial direction, on the side facing away from the first bearing section 16, by a third bearing section 23 arranged concentrically to the axis of rotation A but having double flats. A driver ring 24 made of plastic is rigidly mounted on the third bearing section 23. Similar to the second bearing section 17, the driver ring 24 engages, on the one hand, with play between the narrow ends of two arcuate second wedge segments 25 and, on the other hand, supports the second wedge segments 25 on their curved inner surfaces. The mutually facing broad ends of the second wedge segments 25 have recesses defined by projecting sections of material, each of which recesses receive an axially bent end finger of a second annular spring 26 that forces the second wedge segments 25 apart in the circumferential direction. The two second wedge segments 25 and the second annular spring 26 define a second wedge system 27 which is axially offset from the eccentric 21 with respect to the axis of rotation A.

In addition, the driver ring 24 and the two second wedge segments 25, all three of which lie in one plane, together define a disc 28 that is circumscribed by a circular line, the center point of which is arranged at least approximately on the axis of rotation A. The second wedge segments 25 and the first wedge segments 18 are arranged on radially opposite sides with respect to the axis of rotation A. The longest part of the second annular spring 26 is arranged in a plane parallel to and axially offset from the disc 28. The disk 28 is adjacent the first annular spring 19.

A second internal geared wheel 31 is on the output side of the fitting 11 (e.g., that side of the fitting that is for being moved relative to the seat frame 5 in accordance with the first exemplary embodiment). The second internal geared wheel 31 extends at least partially into a recess of the first internal geared wheel 13, and is movably mounted to the first internal geared wheel 13 as discussed in greater detail below. The second internal geared wheel 31 is slidingly arranged on the disc 28, i.e. on the curved outer surfaces of the second wedge segments 25.

The pinion 22, by means of its second external toothing that is offset axially with respect to its first external toothing, meshes in an internal toothing of the second internal geared wheel 31 on the output side. The internal toothing of the second internal geared wheel 31 is in a recessed space defined by the second internal geared wheel 31. In a comparison between the second external toothing of the pinion 22 and the internal toothing of the second internal geared wheel 31, the number of teeth differs by at least one. The differences in the diameters (between the second external toothing of the pinion 22 and the internal toothing of the second internal geared wheel 31) correspond to those in relation to the internal geared wheel 13 on the frame side, but the diameters—in absolute terms—are smaller, so that the pinion 22 carries out a stepping-up of the rotational movement. The two internal geared wheels 13 and 31 completely surround the pinion 22 and bear in a planar manner against each other in the region positioned radially outwardly from the pinion 22.

In a modified embodiment, the bearing of the internal geared wheels 13 and 31 relative to each other can be designed in such a way that in this case, even under the action of the second wedge segments 25, a certain amount of play remains. The internal geared wheel 31 on the output side is then supported only via the second wedge segments 25 and at the rolling contact point with the pinion. Only in the event of a crash, with severe deformation occurring, would the internal geared wheels 13 and 31 come into contact with one another.

Corresponding to the configuration described in DE 103 05 407 A1 and U.S. patent application Ser. No. 11,136,248, a retaining clamp 33, which is on the frame side of the fitting 11, is attached to the internal geared wheel 13 on the outside of the geared fitting 11, and engages over the internal geared wheel 31; a sliding element made of plastic is interposed between the retaining clamp 33 and the internal geared wheel 31; and the retaining clamp 33 additionally supports the driver 15 in a rotatable manner. A ring 35 made of plastic is clipped with a positive fit and radial pretension onto the end of driver 15 that is distant from the flange formed on the first bearing section 16. On the output side of the geared fitting 11, a retaining clamp 37 is attached to the internal geared wheel 31 and engages over the internal geared wheel 13. A sliding element made of plastic is interposed between the retaining clamp 37 and the internal geared wheel 13. The retaining clamps 33 and 37 and the driver 15 with the clipped-on ring 35 form axial clamping means capable, in the event of a crash, of reliably absorbing not only the forces occurring in the circumferential direction of the geared fitting but also the strong forces, for example up to several kN, that occur also in the transverse direction of the seat frame 5, i.e. in the axial direction of the geared fitting 11.

The geared fitting 11 is driven by the rotation of the driver 15 which then rotates the first eccentric 21 which in turn causes a rolling motion of the pinion 22 on the internal geared wheel 13 on the frame side. The first wedge system 20 ensures (complete) compensation of the play that is present (because of tolerances) between the internal geared wheel 13 on the frame side and the pinion 22, i.e. the play between the internal geared wheel 13 on the frame side and the pinion 22 is eliminated by a radial relative displacement of the driver 15 and the pinion 22. In turn, the pinion 22 causes a rolling motion of the internal geared wheel 31 on the output side. The second wedge system 27 is effective in the direction opposite to that of the first wedge system 20, ensuring radial relative displacement of the driver 15 and the internal geared wheel 31 on the output side. Of the play that exists (because of tolerances) between the pinion 22 and the internal geared wheel 31 on the output side, and of the play that exists (because of tolerances) between the internal geared wheel 13 on the frame side and the internal geared wheel 31 on the output side, the second wedge system—which acts in the opposite direction to the first wedge system 20 and ensures a radial relative displacement of the driver 15 and of the internal geared wheel 31 on the output side—eliminates the smaller of the two amounts of play (completely) and reduces the other play by the same amount.

If the situation is considered from the standpoint of the forces involved, the two wedge systems 20 and 27 exert radial forces acting in opposite directions to each other. The first wedge system 20 acts directly on the pinion 22. The second wedge system 27 acts indirectly also on the pinion 22 via the internal geared wheel 31 on the output side. The force resulting from the first wedge system 27 and exerted on the pinion 22 is adjusted so that it is greater than the force resulting from the second wedge system 27, because otherwise the radial displacement of the pinion 22 caused by the first wedge system 20 might be partially cancelled out by the displacement due to the second wedge system 27. The respective spring forces, the wedge angles and the frictional properties of the contact surfaces are the parameters for adjusting the radial forces acting in the geared fitting 11 due to the wedge systems 20 and 27.

In order to drive the driver 15, a profiled shaft is provided in a known manner. The profiled shaft is inserted into a similarly profiled receiving part that extends centrally through the driver 15 in an axial direction, in alignment with the axis of rotation A, thereby forming a positive fit. A hand wheel is also provided that may be integrally formed with the shaft.

A second exemplary embodiment is substantially similar to the exemplary embodiment described above, unless otherwise described below, and for that reason identical and identically acting components bear reference numbers raised by 100. The geared fitting 111 of the second exemplary embodiment again possesses on the frame side a first internal geared wheel 113 in which a driver 115 is rotatably mounted by means of a first bearing section 116. The axis of rotation A of the driver 115 defines the directional data. A crescent-shaped segment of an eccentric 121, which is defined by the crescent-shaped segment and a second bearing section 117, is mounted on the second bearing section 117 in a rotationally fixed manner. The eccentric 121 supports a pinion 122 that meshes in the internal geared wheel 113 on the frame side. A first semi-circular wedge segment 118 is formed on the crescent-shaped segment of the eccentric 121. The first semi-circular wedge segment 118, together with a second semi-circular wedge segment 125 located in substantially the same plane with respect to the axial dimensions, but slightly offset in the axial direction, and together also with a third bearing section of the driver 115, defines a disc 128. A second internal geared wheel 131 is on the output side of the fitting 111. The second internal geared wheel 131 extends at least partially into a recess of the first internal geared wheel 113, and is movably mounted to the first internal geared wheel 113 by retaining clamps positioned radially outwardly. The second internal geared wheel 131 is mounted slidingly on the disc 128.

At their mutually facing end surfaces, the two wedge segments 118 and 125 comprise wedge surfaces arranged in a plane lying oblique to the axis of rotation A, the angle of the plane to the axis of rotation being outside the self-locking range. A spring ring 126 supported on the retaining clamp on the frame side applies pressure, via an interposed pressure ring, to the second wedge segment 125, in an axial direction, whereby, because of the wedge surfaces an oppositely directed, radial compensating movement of the two wedge segments 118 and 125 is produced. The spring ring 126 and the two wedge segments 118 and 125 thus define a wedge system 127 that compensates for play and that is axially offset from the eccentric 121 with respect to the axis of rotation A. The first wedge segment 118, acting in the plane of the pinion 122, compensates for the tolerance-induced play between the internal geared wheel 113 on the frame side and the pinion 122. The second wedge segment 125 (completely) eliminates whichever is the smaller of the two amounts of play between either the pinion 122 and the internal geared wheel 131 on the output side, or between the internal geared wheel 113 on the frame side and the geared wheel 131 on the output side, and reduces the other play by the same amount.

The disclosure of DE 10 2004 050 152.1, which was filed Oct. 15, 2004, is incorporated herein by reference, in its entirety.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A geared fitting for a vehicle seat, the geared fitting comprising:
   a first internal geared wheel;
   an eccentric mounted for being rotated about an axis of rotation;
   a pinion mounted for being driven by the eccentric and meshing with the first internal geared wheel;
   a second internal geared wheel in which the pinion meshes, wherein the second internal geared wheel is mounted to the first internal geared wheel for there being relative movement between the first and second internal geared wheels in response to the eccentric being rotated about the axis of rotation;
   at least one wedge system that is operative for compensating for
      (a) play between one of the internal geared wheels and the other of the internal geared wheels and/or
      (b) play between one of the internal geared wheels and the pinion;
   the at least one wedge system comprising a first wedge system and a second wedge system;
   the eccentric being at least partially defined by the first wedge system, wherein the first wedge system compensates for play between the first internal gear wheel and the pinion; and
   the second wedge system being mounted axially offset from the eccentric with respect to the axis of rotation,
   wherein for each wedge system of the first and second wedge systems, the wedge system comprises
      (a) two arcuate wedge segments arranged substantially in a common plane, and
      (b) a spring bearing on at least one of the wedge segments.

2. The geared fitting according to claim 1, wherein:
   the second wedge system at least partially defines a disc;
   the second internal geared wheel is slidingly located on the disc;
   the disc is positioned substantially centrically with respect to the axis of rotation; and
   the second wedge system compensates for
      (a) play between the second internal geared wheel and the first internal geared wheel and/or
      (b) play between the second internal geared wheel and the pinion.

3. The geared fitting according to claim 2, further comprising a driver, wherein:
   the driver includes a first bearing section, a second bearing section, and a third bearing section;
   the driver is mounted in the first internal geared wheel, at least by way of the first bearing section, for being rotated around the axis of rotation;
   rotation of the driver around the axis of rotation causes rotation of the eccentric around the axis of rotation;
   the second bearing section at least partially defines the eccentric's configuration; and
   the third bearing section at least partially defines the disc's configuration.

4. The geared fitting according to claim 1, further comprising a driver, wherein:
   the driver includes a first bearing section;
   the driver is mounted in the first internal geared wheel, at least by way of the first bearing section, for being rotated around the axis of rotation; and
   rotation of the driver around the axis of rotation causes rotation of the eccentric around the axis of rotation.

5. The geared fitting according to claim 4, wherein:
   the driver further includes a second bearing section; and
   the second bearing section at least partially defines the eccentric's configuration.

6. The geared fitting according to claim 5, wherein:
   the driver further includes a third bearing section;
   the third bearing section at least partially defines a disc's configuration; and
   the disc comprises the second wedge system.

7. The geared fitting according to claim 4, wherein:
   the driver further includes a second bearing section;
   the second bearing section at least partially defines a disc's configuration; and
   the disc comprises the second wedge system.

8. The geared fitting according to claim 1, further comprising a driver, wherein:
   the driver includes a first bearing section and a second bearing section;
   the driver is mounted in the first internal geared wheel, at least by way of the first bearing section, for being rotated around the axis of rotation;
   rotation of the driver around the axis of rotation causes rotation of the eccentric around the axis of rotation;
   each of the wedge segments includes a curved inner surface, a narrow end, and a broad end that is broader than the narrow end;
   the wedge segments of the first wedge system are mounted at least proximate the second bearing section of the driver so that
      (a) both the curved inner surfaces and narrow ends respectively of the wedge segments of the first wedge system are at least supported, and
      (b) the broad ends of the wedge segments of the first wedge system face one another; and
   the spring of the first wedge system reaches between the broad ends of the wedge segments of the first wedge system.

9. The geared fitting according to claim 1, wherein the wedge segments of the first wedge system and the wedge segments of the second wedge system are arranged on radially opposite sides with respect to the axis of rotation.

10. The geared fitting according to claim 1 in combination with the vehicle seat, wherein:
the vehicles seat includes a seat cushion, and
the geared fitting is mounted for adjusting the seat cushion's inclination.

11. The geared fitting according to claim 10, further comprising a driver, wherein:
the driver includes a first bearing section, a second bearing section, and a third bearing section;
the driver is mounted in the first internal geared wheel, at least by way of the first bearing section, for being rotated around the axis of rotation;
rotation of the driver around the axis of rotation causes rotation of the eccentric around the axis of rotation;
the second bearing section at least partially defines the eccentric's configuration; and
the third bearing section at least partially defines the second wedge system's configuration.

12. The geared fitting according to claim 1, further comprising a driver, wherein:
the driver includes a first bearing section, a second bearing section, and a third bearing section;
the driver is mounted in the first internal geared wheel, at least by way of the first bearing section, for being rotated around the axis of rotation;
rotation of the driver around the axis of rotation causes rotation of the eccentric around the axis of rotation;
the second bearing section at least partially defines the eccentric's configuration; and
the third bearing section at least partially defines the second wedge system's configuration.

13. The geared fitting according to claim 1, further comprising a driver and a carrier ring, wherein:
the driver includes a first bearing section and a second bearing section;
the driver is mounted in the first internal geared wheel, at least by way of the first bearing section, for being rotated around the axis of rotation;
rotation of the driver around the axis of rotation causes rotation of the eccentric around the axis of rotation;
each of the wedge segments includes a curved inner surface, a narrow end, and a broad end that is broader than the narrow end;
the carrier ring is arranged on the second bearing section;
the carrier ring engages between the narrow ends respectively of the wedge segments of the second wedge system;
the carrier ring supports the curved inner surfaces of the wedge segments of the second wedge system; and
the spring of the second wedge system reaches between the broad ends of the wedge segments.

14. The geared fitting according to claim 13, wherein:
the driver further includes a third bearing section; and
the third bearing section at least partially defines the eccentric's configuration.

* * * * *